United States Patent Office 2,813,616
Patented Nov. 19, 1957

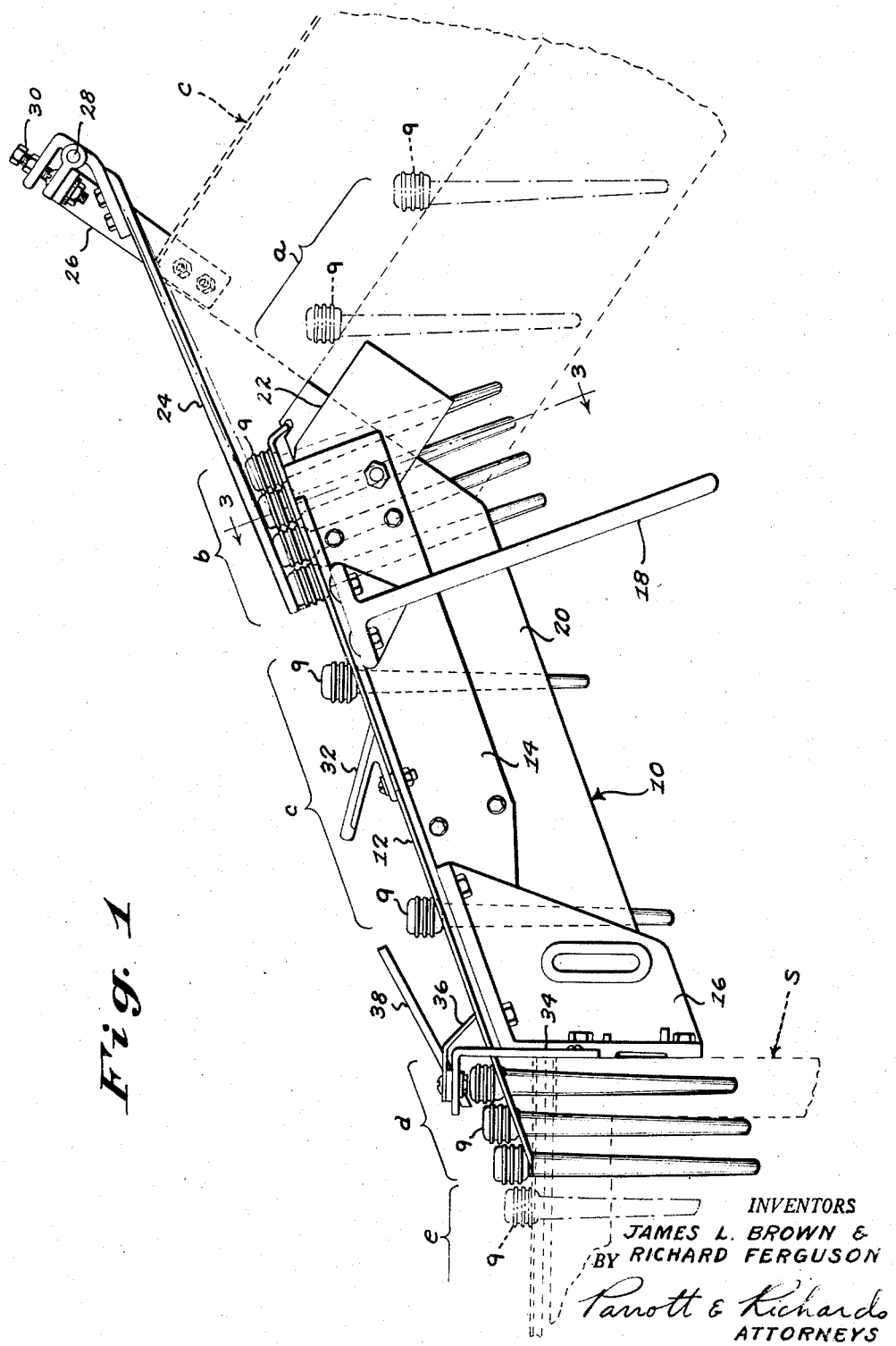

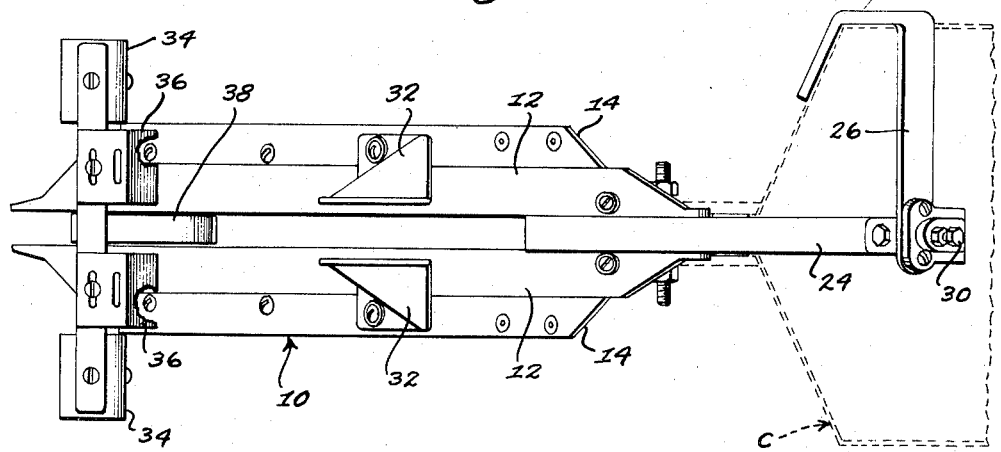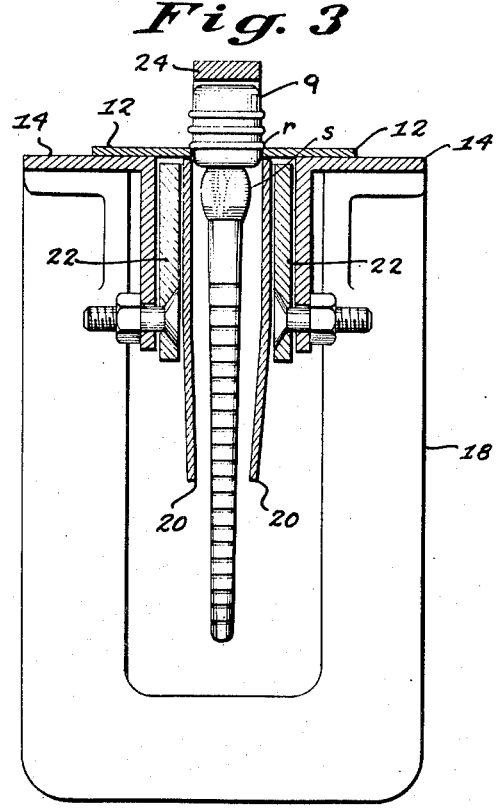

2,813,616

FEED CHUTE MECHANISM

Richard Ferguson and James L. Brown, Charlotte, N. C., assignors to Deering Milliken Research Corporation, near Pendleton, Oconee County, S. C., a corporation of Delaware Application October 27, 1955, Serial No. 543,107

5 Claims. (Cl. 198—26)

This invention relates to feed chutes of the type arranged for receiving and delivering articles, such as quills or filling bobbins, having an enlarged head at one end of an elongated barrel, and being fed in single file alignment hanging from the heads thereof; and more particularly to an improved arrangement for a feed chute of this sort by which articles fed at a relatively rapid rate thereto can be handled effectively and delivered in an orderly fashion.

There are frequent occasions when quill-shaped articles of the kind noted above must be delivered in regular order from a supply in which they are ararnged at random, as in the feeding of spent filling bobbins for cleaning. Conveniently, a conveyor means having a pair of spaced apart inclined conveyor belts forming an open-bottomed feeder trough such as disclosed in copending applications Serial No. 411,480, filed February 19, 1954, and Serial No. 482,077, filed January 17, 1955, may be used to particular advantage for positioning such bobbins in single file alignment and feeding them to a chute structure for delivery to a cleaning or stripping device. In order to employ this conveyor means most effectively, it should be operated so that the feeding rate or speed of the aligned bobbins is rapid enough to carry off each bobbin to the delivery chute as soon as it is aligned and thereby maintain the conveyor means continuously active in positioning succeeding bobbins for feeding.

However, when the bobbin feeding rate is sufficiently rapid for operation of the conveyor means to the best advantage, difficulty is often encountered in handling the delivery of the bobbins to the cleaning device, because the conveyor means is characterized by an upwardly inclined disposition and the delivery chute structure is normally inclined downwardly therefrom to direct bobbins received from the conveyor means by gravity to the cleaning device, so that a change in direction of the rapidly fed bobbins must be effected at the chute structure and a constant tendency of the bobbins to become misaligned and to jam during this change in direction must be overcome. Various sorts of confining means have heretofore been employed in chute structures to maintain a feeding alignment, but a confining means must be arranged to accommodate freely the articles being fed so as not to impede the feeding, and articles being fed rapidly will accordingly still tend to jam and, when jammed, will be more troublesome to release the more fully they are confined.

According to the present invention, a feed chute mechanism is provided by which a predominant portion of articles being fed rapidly thereto can be handled effectively for orderly delivery, while allowing any of the articles that resist such handling unduly to escape immediately from the chute structure and thereby avoid interference with the other articles. Briefly described, this feed chute mechanism of the present invention is characterized by inclined slide members spaced for receiving and slidably supporting the articles being fed by their heads in single file alignment, and a pivoted arm member disposed above and adjacent the upper ends of these slide members with an arm reach extending toward the lower slide member ends in alignment with the single file alignment of the articles being fed so as to ride the heads of the articles as they are received at the upper ends of the slide members and thereby position them properly for delivery movement to the lower slide member ends, while remaining yieldable, however, to allow escape adjacent the upper slide member ends of any articles that resist positioning unduly, as noted above.

This feed chute arrangement also has the further important operating advantage of acting to collect successively the rapidly fed articles as they are received by the feed chute and retaining a progressive group of these articles beneath the pivoted arm member adjacent the upper ends of the slide members, so that each leading article of this group is released only upon displacement from beneath the arm member by the feeding pressure of succeeding articles at the rear of the group and is thereby controlled, despite the rapid feeding rate of the articles being received, to be delivered only by gravity in an orderly manner at the lower end of the feed chute.

These and other features of the present invention are described in further detail below in connection with the accompanying drawings, in which:

Fig. 1 is a side view of a feed chute mechanism arranged in accordance with the present invention;

Fig. 2 is a corresponding plan view; and

Fig. 3 is a sectional detail taken substantially on the line 3—3 in Fig. 1.

Referring now in detail to the drawings, the illustrated feed chute mechanism embodying the present invention, as designated generally by the reference numeral 10, is shown arranged for representative use in delivering spent quills or filling bobbins $q$ from a conveyor means of the type disclosed in the above noted copending applications, as indicated in broken lines at C, to a stripping or cleaning device, likewise indicated in broken lines at S.

The structure of the feed chute mechanism 10 comprises a pair of slide members or rails 12 carried on angle supports 14 that are attached by means of a mounting bracket 16 at the entrance end of the stripping device S with a downward inclination thereto. The angle supports 14 are also fitted with a spacing bracket 18 by which they are fixed adjacent their upper ends to maintain the slide members 12 properly spaced for slidably supporting the bobbins $q$ at the heads thereof. The bobbins $q$ commonly have metal rings $r$ arranged at their head portions, and the slide members 12 are preferably spaced for supporting engagement beneath the metal ring $r$ that is lowest when the bobbin barrel portion is depending (see Fig. 3), thereby minimizing wear on the bobbin heads and allowing maximum clearance in relation to the spent yarn bunch (as seen at $s$ in Fig. 3) that will characteristically be felt on the barrel portion of the bobbins $q$ being fed for stripping or cleaning. Below the slide members 12, filler sections 20 are arranged for preventing excessive tilting of the bobbins $q$, and the angle supports 14 are connected to assembly plates 22 at the delivery end of the conveyor means C for aligned positioning of the slide members 12 thereat.

The conveyor means C, as disclosed in detail in the above noted copending applications, comprises an inclined, trough-shaped receptacle arranged for positioning spent filling bobbins $q$ to hang from the heads thereof in single file alignment and for feeding the bobbins $q$, when aligned, upwardly therein at a relatively rapid rate, as illustrated at the position $a$ in Fig. 1. The bobbins $q$ usually reach the delivery end of the conveyor means C spaced from one another more or less as indicated in Fig. 1 at $a$, although this spacing can vary substantially upon any fluctuation in the rate at which spent bobbins $q$ are supplied to the conveyor means C for alignment and feeding, but in any case the aligned bobbins q will be traveling rapidly at the position a as they are delivered to the feed chute mechanism 10, and some special provision must be made to receive and handle these rapidly traveling bobbins q in the feed chute 10 for orderly delivery to the stripping device S.

For this purpose, a pivoted arm member 24, as previously mentioned, is arranged above the upper entrance ends of the feed chute slide members 12 in alignment with the feeding direction of the aligned bobbins q so as to ride the heads of the bobbins q for positioning them properly on the slide members 12. This pivoted arm member 24 is supported from a bracket 26, that may conveniently be attached adjacent the delivery end of the conveyor means C, so that it is pivoted on an axis at 28 spaced in advance of the entrance end of the feed chute 10, and from which pivot axis 28 it extends above the slide members 12 toward their lower ends with a reach corresponding to several times the head diameter of the bobbins q. Also, the extending disposition of the pivoted arm member 24 is arranged to have a downward inclination slightly greater (e. g., greater in the order of about 5°) than that of the slide members 12 when the extending end of the arm member 24 is disposed above the slide members 12 at the height of the heads of the bobbins q.

As a result of this arrangement, the pivoted arm member 24 acts to change the direction of each bobbin q received from the conveyor means C and position it on the feed chute slide members 12 as part of a group of bobbins q collected beneath the arm member 24 at the position illustrated in Fig. 1 at b. This group of bobbins q collects at the position b because of the slightly greater downward inclination of the arm member 24 that disposes it to ride directly only the leading bobbin q thereunder and thereby to retard the downward delivery of a progressive group of bobbins q from which the leading bobbin is only released by the feeding pressure of succeeding bobbins fed by the conveyor means C beneath arm member 24. Accordingly each leading bobbin q beneath the arm member 24 is progressively released individually for downward delivery by gravity on the slide member 12 as illustrated in Fig. 1 at the position c.

In this connection, it should be noted that an adjustable stop means, such as a set screw 30, is provided for the arm member 24 adjacent its pivoted mounting at 28 for limiting the downward pivoting of arm member 24 in relation to the head height of the bobbins q, and thereby regulating the retarding drag exerted by the arm member 24 during its positioning action on the bobbins q, so as to control the bobbins q effectively while not impeding their downward delivery in the feed chute 10 excessively. Normally, an adjustment of the arm member 24 so that its extending end may pivot downwardly to a position about 1/16" lower than the height of the bobbin heads will dispose the arm member 24 for effective operation, although this position may need slight adjustment one way or the other under particular operating conditions, and the stop means 30 is therefore made readily adjustable.

Because of the previously mentioned rapid feeding rate at which the bobbins q are delivered by the conveyor means C to the feed chute mechanism 10, it sometimes happens that certain misaligned bobbins, or bobbins that have not been completely aligned, are delivered with the bobbins being regularly fed to the feed chute 10, or that a regularly fed bobbin will jump out of alignment upon reaching the feed chute 10 due to the rapid rate at which it has been delivered. When this happens, the misaligned bobbin will cause the rapidly following bobbins to collect and jam unless it is either repositioned or removed promptly.

The pivoted positioning arm member 24 provided according to the present invention is arranged to deal with this situation effectively by remaining yieldable for upward pivoting to allow immediate escape adjacent the upper ends of the feed chute slide members of any bobbins that resist positioning unduly as they enter the feed chute 10. During normal operation a predominant portion of the bobbins q being delivered by the conveyor means C will be received and positioned regularly beneath the arm member 24, and any that happen to be so disposed as to resist this positioning will simply be allowed to escape above the slide members 12 and fall overboard where they may be collected in some suitable manner (not shown) and returned periodically to the conveyor means C for rehandling.

In order to provide more certainly for directing any escaping bobbins off of the slide members 12 before they reach the lower slide member ends, a pair of deflector plates 32 are preferably mounted on the slide members 12 in spaced relation below the extending end of the arm member 24 and just outside the downward sliding path of the bobbins q on the slide members 12. Also, adjacent the lower ends of slide members 12 mounting brackets 34 are attached at the entrance end of the stripping device S to carry shroud plates 36 above the slide members 12 at either side of the delivery path for the bobbins q so as to insure further that no escaped bobbin will become lodged to obstruct this path. In addition, the mounting bracket 34 carries a hold down bar 38 above the bobbin delivery path to make certain that the delivered bobbins q are riding the slide members 12 properly as they collect at the lower slide member ends, as illustrated in Fig. 1 at d, to feed successively into the stripping device S as indicated at the Fig. 1 position e.

The present invention has been described in detail above for purposes of illustration only and is not intended to be limited by this description or otherwise except as defined in the appended claims.

We claim:

1. A feed chute mechanism for filling bobbins, said mechanism comprising a pair of inclined slide members spaced for slidably supporting said bobbins at the heads thereof in single file alignment with the bobbin barrels depending while allowing sliding movement of said bobbins from the upper to the lower ends of said slide members, and an arm member pivotally mounted above said slide members and reaching forwardly in the direction of bobbin movement from its pivot mounting along an upper end portion of said slide members toward the lower slide member ends in alignment with the single file alignment of bobbins supported by said slide members, whereby said pivoted arm member is disposed to ride the heads of said bobbins adjacent the upper ends of said slide members and thereby act to position said articles properly for orderly sliding movement toward the lower slide member ends while remaining yieldable to allow escape adajcent said upper ends of any bobbins resisting said positioning unduly, a pair of oppositely laterally outwardly facing L-channel deflector plates on said slide members and inclined thereto and disposed in spaced relation from the extending end of said arm member for directing any escaping bobbin laterally off said slide before they reach the lower slide member ends.

2. A feed chute mechanism for delivering spent filling bobbins to a cleaning means, said mechanism comprising a pair of inclined rails spaced for slidably supporting said bobbins at the heads thereof in single file alignment with the barrels thereof depending while allowing sliding delivery movement of said bobbins from the upper to the lower ends of said inclined rails, and an arm member pivotally mounted adjacent and above the upper ends of said rails and extending above said rails adjacent the upper ends and toward the lower ends thereof in alignment with the single file alignment of bobbins supported by said rails and with an extending reach from the upper rail ends corresponding to the aggregate head diameter of several bobbins, whereby said pivoted arm member is disposed to ride the heads of said bobbins adjacent the upper ends of said rails and thereby act to position said bobbins properly for orderly sliding movement toward the lower rail ends while remaining yieldable to allow escape adjacent said upper rail ends of any bobbins resisting said positioning unduly.

3. A feed chute mechanism as defined in claim 2 and further characterized in that the forwardly extending disposition of said arm member when riding said bobbin heads is inclined slightly more than said rails so that said arm member tends to ride directly only the head of the leading bobbin disposed thereunder.

4. A feed chute mechanism as defined in claim 2 and further characterized in that an adjustable stop means is provided for limiting the downward pivoting of said arm member and thereby regulating the riding action thereof on said bobbin heads.

5. The combination with an upwardly extending conveyor means for positioning spent filling bobbins to hang from the heads thereof in single file alignment and for feeding the thus aligned bobbins at a relatively rapid rate, of a downwardly extending feed chute mechanism for receiving the rapidly fed bobbins from said conveyor means and delivering them in said alignment to a cleaning means, said mechanism comprising a pair of rails spaced for slidably supporting said aligned bobbins at the heads thereof and disposed at the discharge end of said conveyor means with a downward inclination for successively receiving aligned bobbins fed thereby and allowing sliding delivery movement of said bobbins to the lower rail ends, and an arm member pivotally mounted above and adjacent the discharge end of said conveyor means and extending therefrom above said rails in, and aligned with, the feeding direction of said bobbins, said pivotal mounting being disposed in advance of the entrance to said rails, the extending reach of said arm member above said rails corresponding to several times the head diameter of said bobbins, the extending disposition of said pivoted arm member being inclined downwardly at a slightly greater degree than said rails when the extending end of said arm member is disposed above said rails at the height of the heads of said bobbins, and the pivot mounting for said arm member having an adjustable stop means associated therewith for limiting the downward pivoting of said arm member above said rails in relation to the head height of said bobbins, whereby said arm member acts to position properly on said rails adjacent the upper end thereof the rapidly fed bobbins received from said conveyor means and serves to regulate the delivery of bobbins to the lower ends of said rails in an orderly fashion by riding the leading bobbin thereunder and thereby retarding the downward delivery of each bobbin until released by the feeding pressure of succeeding bobbins fed by said conveyor means beneath said arm member, all while remaining yieldably pivotable upward to allow escape adjacent said upper rail ends of any of said rapidly fed bobbins that resist positioning unduly.

References Cited in the file of this patent

UNITED STATES PATENTS

| | | |
|---|---|---|
| 396,467 | Coleman | Jan. 22, 1889 |
| 1,597,439 | Fagan et al. | Aug. 24, 1926 |